May 2, 1933.                    D. C. SCOTT                    1,906,340
                            FATIGUE TESTING MACHINE
                              Filed Feb. 9, 1927                2 Sheets-Sheet 1
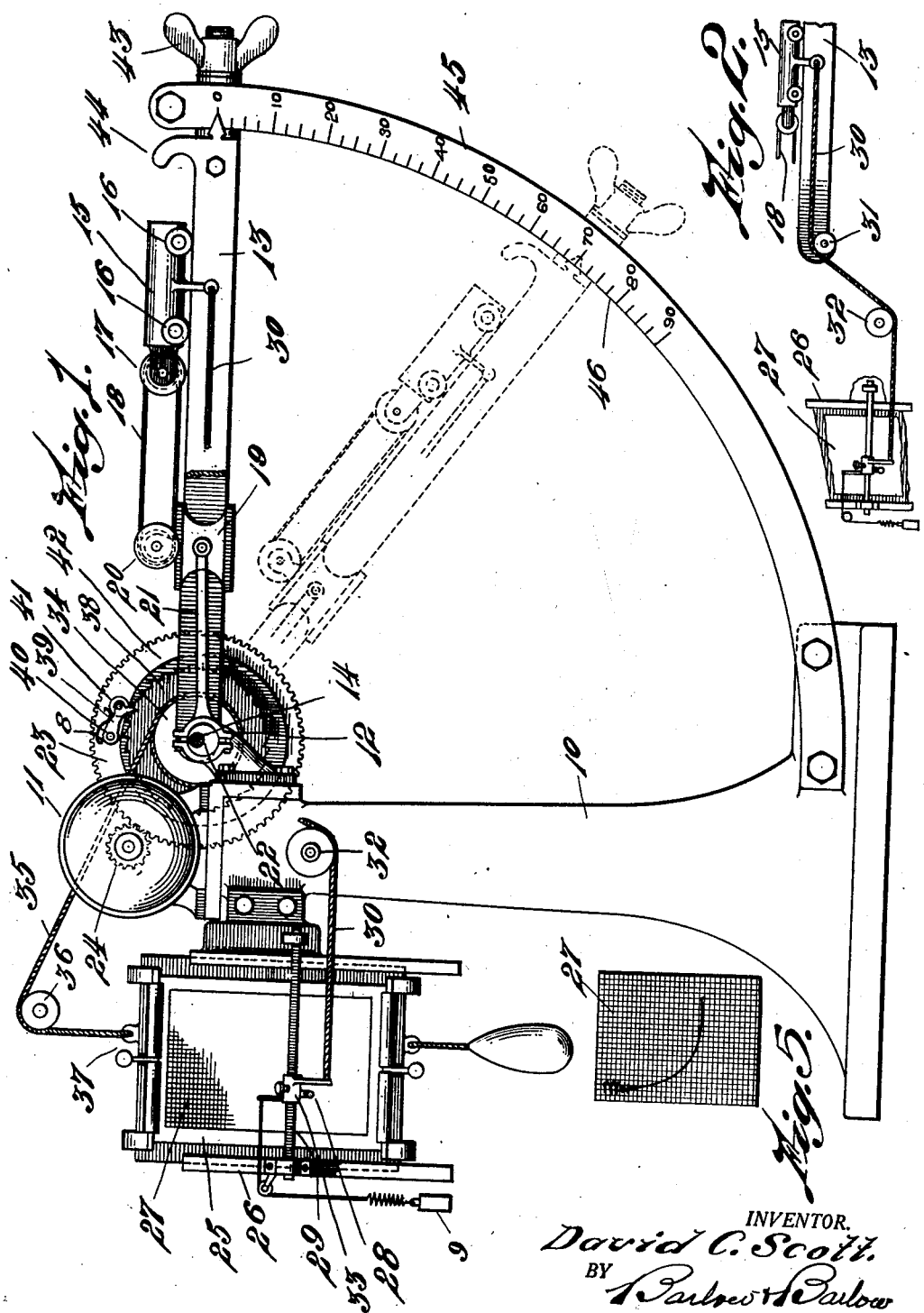
INVENTOR.
David C. Scott.
BY Parker & Barlow
ATTORNEYS.

May 2, 1933.  D. C. SCOTT  1,906,340
FATIGUE TESTING MACHINE
Filed Feb. 9, 1927  2 Sheets-Sheet 2

INVENTOR.
David C. Scott
BY Barlow & Barlow
ATTORNEYS.

Patented May 2, 1933

1,906,340

UNITED STATES PATENT OFFICE

DAVID C. SCOTT, OF PROVIDENCE, RHODE ISLAND, ASSIGNOR TO HENRY L. SCOTT COMPANY, OF PROVIDENCE, RHODE ISLAND, A CORPORATION OF RHODE ISLAND

FATIGUE TESTING MACHINE

Application filed February 9, 1927. Serial No. 166,916.

This invention relates to an improvement in testing machines; and has for its object to provide in such a machine means for placing under tension the specimen to be tested and applying a fatiguing vibration to the specimen while under such tension.

A further object of the invention is to provide means in the testing machine for increasing the load applied to the specimen up to the point where the load ceases to vibrate by the action of the vibrations of the specimen connected thereto.

A still further object of the invention is the provision of means for indicating or determining the amount of increase of the load.

The invention further consists in the provision of means for recording the result of the test by this fatiguing method.

With these and other objects in view the invention consists of certain novel features of construction, as will be more fully described, and particularly pointed out in the appended claims.

In the accompanying drawings:

Figure 1 is a side elevation showing one form of machine or apparatus which may be employed for exerting a so-called fatiguing test upon the specimen to be tested.

Figure 2 is a fragmental portion of the testing machine showing the swinging arm with the weight mounted thereon, and the weight as being connected through a cord to the recording pen to move the same across the face of the recording sheet.

Fig. 5 is a card illustrating graphically the effect of the fatigue upon a specimen being tested.

Figure 3:
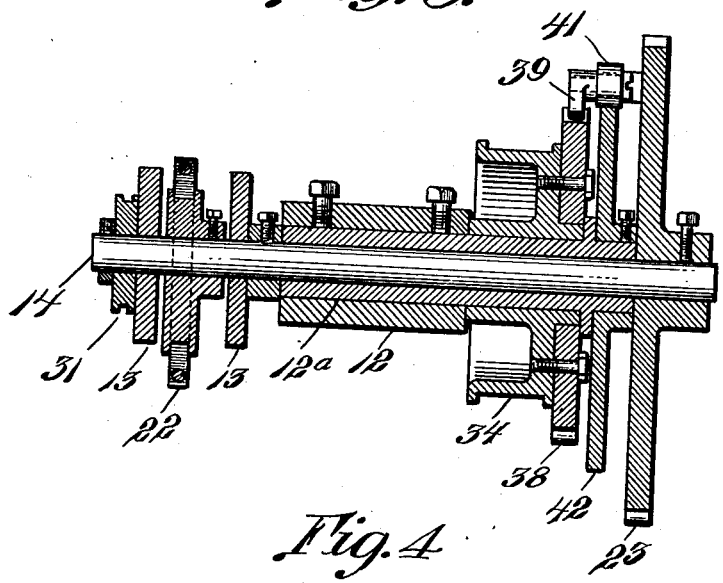
Fig. 3 is a central sectional view thru the ratchet wheel and drum, showing the manner of fixing the gear, cam, drum and ratchet wheel to the frame of the machine.

By a fatigue test I mean acting upon the specimen and indicating the effect or change that takes place in the molecular construction or the breaking down of the material through change in the physical characteristics of the specimen under tension upon being simultaneously subjected to a vibratory action.

It is well known that by producing a vibratory action upon most materials while under tension this action serves to fatigue or rapidly reduce the operating life of the material; particularly is this true when this fatiguing action is applied to rubber. In the majority of instances the life of rubber depends to a more or less extent upon its ability to withstand this fatiguing test under a load. For example, the rubber used in cementing together the adjacent plies in automobile tires or casing is subjected to rapid flexing or oscillations while traveling over the road which exerts a fatiguing action upon this cement. On the extent of the effective operating life of this cement depends the life of the tire; that is, when the cement fails to hold the plies together the tire disintegrates and its wearing life is at an end. It is, therefore, found of great practical advantage to be able to subject samples of different rubber compounds to a so-called fatiguing test in the laboratory to determine the qualities of the different specimens and their ability to withstand this fatiguing action to which they may be subjected in practice so as to determine their fitness for the work; and the following is a detailed description of the present embodiment of my invention showing one arrangement of mechanism by which these fatiguing tests may be made.

With reference to the drawings, 10 designates the frame or standard of a machine, on the upper end of which is mounted the driving motor 11. On this frame is mounted a bracket 12 in which a hollow elongated bearing 12ª is secured. The bore of the member 12ª forming a bearing for the shaft 14. The weight carrying arm 13 is pivotally mounted on the hinge pin 14. A tension weight 15 is mounted on rollers 16 on this arm to be moved longitudinally along the upper edge thereof, one end of the weight being provided with a pulley 17 about which one end of the specimen 18 to be tested is passed and which serves as an anchor, the opposite end of the specimen being connected to the vibratory slide 19 by means of the pulley 20, which also serves as an anchor, the slide being supported in the arm 13. This vibratory slide is connected through a connecting rod 21 to a cam 22 which cam is caused to rotate and impart a reciprocating or vibrating action to the slide 19 through the rotation of the gear 23 which is mounted on the cam shaft, the gear being driven from pinion 24 on the motor 11.

In order to record the stresses imparted to the specimen and also the elongation of the specimen due to combined action of the weight and oscillations upon it, I have provided a chart or card carrying platen 25 which is mounted in the ways 26 to be moved upward by action of the oscillating mechanism presently described. On this platen is mounted the chart 27; the marking pen 28 is arranged to slide laterally on the bar 29 being moved from left to right across the chart by an outward movement of the weight 15 through the cord 30 which is best illustrated in Figure 2, which cord is led over the pulleys 31 and 32 to produce this lateral feeding movement upon this pen carrying slide 33. A comparatively light spring suspended weight 9 is provided to apply a flexible tension to the pencil carrier in the opposite direction, to assist in recording the vibrations of the weight.

Figure 4:
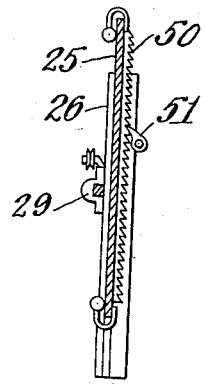
Fig. 4 is a longitudinal section through the platen and its support.

In order to feed the chart platen upwardly when the machine is in action, I have rotatably mounted a drum 34 on the member 12ª around which drum is wound the cord 35 which leads over the pulley 36 to be attached at 37 to the platen. This drum is actuated through a pawl and ratchet mechanism, the ratchet wheel 38 being secured to the drum while the pawl 39 is pivoted at 40 to the gear 23. This pawl is provided with a roller 41 which engages the periphery of a cam 42 secured against rotation to the member 12ª. As the pawl, with its roller 41, is caused to revolve around the cam by the gear 23, the roller 41 is kept engaged with the peripheral edge of the cam by a spring 8. The shape of this cam permits the pawl to engage a predetermined number of teeth of the ratchet wheel and advance it and the drum secured thereto a predetermined portion of a revolution for every revolution of the roller 41 around the cam. The rotation of the drum winds the cord 35 attached thereto and lifts the chart platen relative to its recording pen as the testing operation on the specimen proceeds. To prevent the platen from downward movement by gravity when the pawl 39 is disengaged from the ratchet wheel 38, I have provided a pawl 51 mounted on one of the ways 26 which engages a ratchet rack 50 mounted on the rear side of the platen 25. See Figure 4.

In order to control the effective pull of the weight 15 upon the specimen 18, I have arranged this arm 13 so that it may be swung downward from a horizontal position by simply loosening the thumb nut 43 which clamps the end of the arm to the graduated quadrant 45, the greater the angularity of this arm as indicated by the scale 46 on the quadrant the greater becomes the effective action of the weight upon the specimen being tested.

In the operation of this testing machine, I connect one end of the specimen to the slide member, and its opposite end to the weight by any suitable means; the motor is then started to oscillate the slide member and the weight carrying arm 13 is then dropped gradually until the vibrating action of the specimen fails to exert a vibrating movement on the weight. This angularity of the arm is noted and determines the amount of weight tension applied to the specimen without being affected by its vibrating motion; the vibration then continues to fatigue or use up the life of the sample which is noted by the continual dropping of the weight due to the elongation of the sample until the specimen breaks which breaking down point is noted on the chart.

In order to limit the outward motion on the weight I have provided a stop 44 on the arm to prevent the weight being dismounted when the sample is broken. The line on the card or chart, shown in Figure 3, graphically shows the result of a typical test the abscissæ of the chart indicating the elongation of the specimen while the ordinates illustrate the oscillations imparted thereto.

By the use of my vibrating or fatiguing testing machine, I am enabled to obtain in the laboratory in a few moments the effect of practical service of material over a long period of time. I have herein shown and described one form of device for applying a fatiguing test to material but any suitable mechanism may be employed for this purpose without departing from the spirit and scope of my invention.

The foregoing description is directed solely towards the construction illustrated, but I desire it to be understood that I reserve the privilege of resorting to all the mechanical changes to which the device is susceptible, the invention being defined and limited only by terms of the appended claims.

I claim:

1. In a testing machine, spaced tensioning members, means for attaching each of said members to the specimen to be tested, one of said members being adapted to impose tension on the above specimen by virtue of its weight, means for operating the other of said members to set up a fatigue vibration in the specimen, means for varying the vertical angularity of the first mentioned member to modify the tensioning effect of said member on the specimen, and means for recording the effect of the test.

2. In a testing machine, a mass, a vibratory member, means for attaching the specimen to said mass and member, means for increasing the tensioning effect of the mass to a point where the mass ceases to vibrate, means for operating said member to set up fatiguing vibrations in the specimen, and means for recording the fatigue effects of the test.

3. In a testing machine, a weight arm, a weight adjustably supported on said arm, means for attaching said weight to one end of the specimen to be tested, a vibrating member mounted on said arm and attached to the other end of said specimen, said arm being adapted to be adjusted to different inclined positions to vary the tensioning effect of the weight upon the specimen, and means for operating said vibrating member to fatigue the specimen being tested.

4. In a testing machine, a weight arm, a weight adjustably mounted on said arm, means for attaching said weight to one end of the specimen to be tested, a vibrating member mounted on said arm and attached to the other end of said specimen, means whereby said arm may be adjusted to different inclined positions to vary the pull of the weight on the specimen, means for operating the vibrating member to fatigue the specimen and means for recording the fatigue effect of the test.

5. In a testing machine, spaced holding members for maintaining the specimen under test between said members, means of constant mass for exerting a force on one of the holding members, whereby the specimen is placed under tension, means for subjecting the other of said members to vibration, whereby both members and the specimen are caused to vibrate, means for varying the force exerted by said constant mass acting on the first mentioned member to a point where its mass ceases to vibrate while the specimen continues to vibrate, and means for recording the results of the test.

6. In a testing machine, members for holding the specimen under test, means for applying tension to said specimen by virtue of the weight of one of said members, means for varying such tension by changing the angularity of said member, means for subjecting said specimen to vibration through the other of said members, a test record device, a recording element cooperating therewith, means for intermittently moving said record device in one direction, and means for moving said recording element in an intersecting direction while subjecting it to the vibrations of the specimen.

In testimony whereof I affix my signature.

DAVID C. SCOTT.